March 8, 1932. H. LAMB ET AL 1,848,531
DEVICE FOR DISPERSING A FLUID THROUGH A VISCOUS LIQUID
Filed Sept. 13, 1927 2 Sheets-Sheet 1
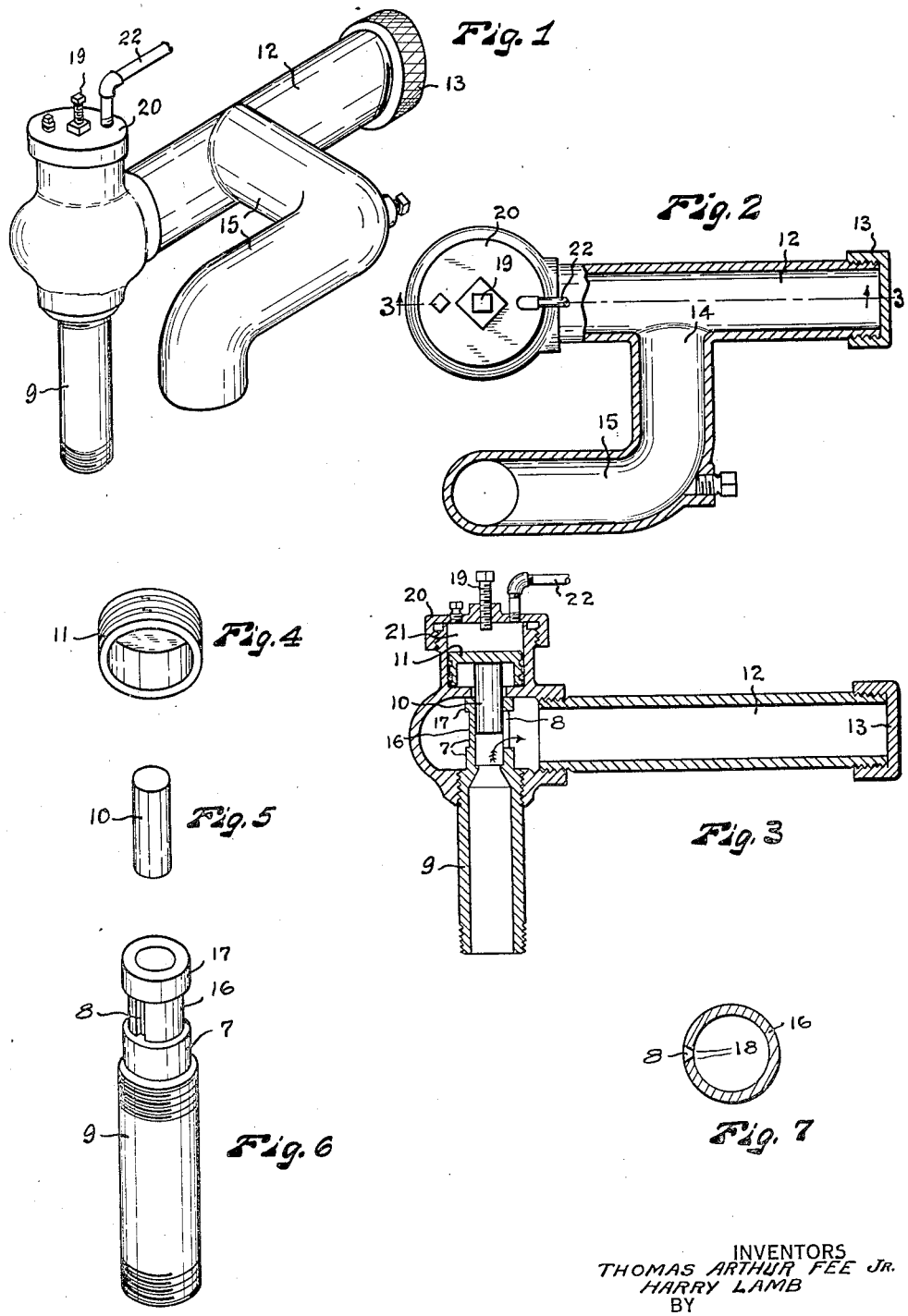
INVENTORS
THOMAS ARTHUR FEE JR.
HARRY LAMB
BY
ATTORNEY March 8, 1932.　　H. LAMB ET AL　　1,848,531
DEVICE FOR DISPERSING A FLUID THROUGH A VISCOUS LIQUID
Filed Sept. 13, 1927　　2 Sheets-Sheet 2

INVENTORS
THOMAS ARTHUR FEE Jr.
HARRY LAMB
BY
ATTORNEY

Patented Mar. 8, 1932

1,848,531

UNITED STATES PATENT OFFICE

HARRY LAMB AND THOMAS ARTHUR FEE, JR., OF SEATTLE, WASHINGTON, ASSIGNORS TO ILLUM INCORPORATED, OF SEATTLE, WASHINGTON, A CORPORATION OF WASHINGTON

DEVICE FOR DISPERSING A FLUID THROUGH A VISCOUS-LIQUID

Application filed September 13, 1927. Serial No. 219,347.

Our invention relates to a process of dispersing a fluid through a viscous liquid, the product thereof, and a device for carrying out the same.

For definiteness of illustration and clearness of description, we will describe our invention as applied to the condition and problem involved in manufacturing shortening compounds. It will be understood, however, that our invention is not to be limited to any such specific application, but is co-extensive with all fields where like conditions and problems obtain.

Our process of treating emulsions is characterized by compressing the same under relatively high pressure and then suddenly releasing said pressures by discharging the same through an aperture in a stream controlled as to direction and maintained relatively uniform in releasing at the aperture even though the pressures on the material may vary.

Devices as heretofore manufactured for the making of shortening compound in common practice provide the fluid medium or air to the compound by beating the same in the beater pan previous to going through the metering device. One purpose of supplying the air to the compound is to make the same white, otherwise the compound would be of a dark yellow color and quite unsatisfactory to the consumer. The trade positively requires that the shortening should be of a white color. Serious objection obtains to the compound thus provided on account of the uneven distribution therethrough and on account of the large and non-uniform size of the air globules which are thus provided, and above all, to the relatively short period of time during which the compound will not become rancid or as the trade says "stand up". After said relatively short period the compound "breaks down" and loses its body character, i. e. becomes "vaseliney", loses its white color and becomes rancid. The period of time is about thirty days for such compound to "stand up" after which the retailers are required to return the compound which may then remain on their shelves to the manufacturer to be again refined. The shortness of said period of time requires the establishment of plants throughout the country in order that the said product may be relatively locally manufactured, all of which involves a great expense to the manufacturer and consequently to the consumer as is obvious from the necessity of such continuous replacement and re-shipping.

Ordinarily, shortening compound signifies a shortening composed of vegetable oil and animal fat. Another type of shortening is composed of vegetable oil and animal stearine, while a third type of shortening is composed of vegetable oil and vegetable stearine. It is necessary to provide the vegetable oil with animal fat or stearine in order to provide the ingredients which will render the liquid a solid when the liquid cools. The period during which the compound will stand up is increased where the particular mixture consists in the main of one ingredient such as vegetable oil. That is, there would be less tendency to separate into the respective ingredients. It is therefore desirable to provide a compound in which one ingredient may represent the greater per cent of the total.

A primary object of our invention is to provide a process and device which will make a compound which overcomes these objections.

Furthermore, it is common practice to provide in devices presently in use a strainer at or near the pump which pumps the compound in the liquid form to the metering device in order to eliminate the lumpy character of the animal fat or stearine ingredient. A serious objection obtains to providing the screen at the pump in that it is too far remote from the discharge outlet, i. e., the outlet directly supplying the material to the container to insure the elimination of the lumps which often form enroute to the discharge outlet. A primary object of our invention is to eliminate the necessity of such screen and to provide a device which positively insures the elimination of all lumpiness in the compound.

Also, it is common practice to subject the liquid compound to a relatively low pressure such as fifteen to thirty pounds. This provides the product of present practice whiteness. This low pressure does not provide in any way for the elimination of the lumps in the material. With the present practice, devices commonly in use to increase this pressure have the interesting result of eliminating the whiteness of color and have a tendency to bring about a separation of the ingredients so that free oil is very much in evidence. However, we have found that with our device that subjecting the material to a relatively high pressure, preferably one hundred and fifty pounds or more, results in a whiter product and one characterized in "standing up" much longer. The product provided by our device is characterized by having the air distributed uniformly through the material in most minute particles of uniform size. Our product may be described as resembling more nearly an amalgamation of the minute particles of air with the ingredients of the compound while the product manufactured by present processes and devices is more of the character of a mixture of air and the ingredients.

Under present common practice the shortening component ingredients have air dispersed therethrough in the beater pan which develops the whitening effect. Thereafter the material is conducted to the metering device or to the filling means, under relatively low pressure, i. e., about forty pounds. Great care is taken to utilize low pressure in order to avoid losing the whitening effect. In direct contrast with this procedure we subject the material to a relatively high pressure, i. e., not less than one hundred fifty pounds,— two hundred fifty pounds being found to be a very satisfactory working pressure. This high pressure operates to compress the air within the material and then, according to our invention, this pressure is suddenly released by discharging the material into a chamber in a stream which does not contact the chamber walls until its high velocity is substantially lost. The sudden expansion of the air absorbs heat and thereby assists in suddenly setting the material by subjecting it to a relatively cool temperature. We preferably discharge the said stream at high velocity into like material already expanded and then utilize a part of the expansion force to cause the material to become thoroughly mixed.

The above mentioned general objects of our invention, together with others inherent in the same, are attained by the mechanism illustrated in the following drawings, the same being preferred exemplary forms of the embodiment of our invention throughout which drawings like reference numerals indicate like parts.

Figure 1, is a view in perspective of the device embodying our invention;

Fig. 2, is a plan view with parts broken away;

Fig. 3, is a view in longitudinal section on dotted lines 3, 3 of Fig. 2;

Fig. 4, is a view in perspective of a material discharge outlet conduit and sleeves mounted therein having a slot;

Fig. 5, is a view of a piston member which operates within said sleeves to close said slot;

Fig. 6, is a view of a resiliently held piston which operates in opposition to said first piston;

Fig. 7, is a cross-sectional view of a preferred form of slot;

Figure 8:
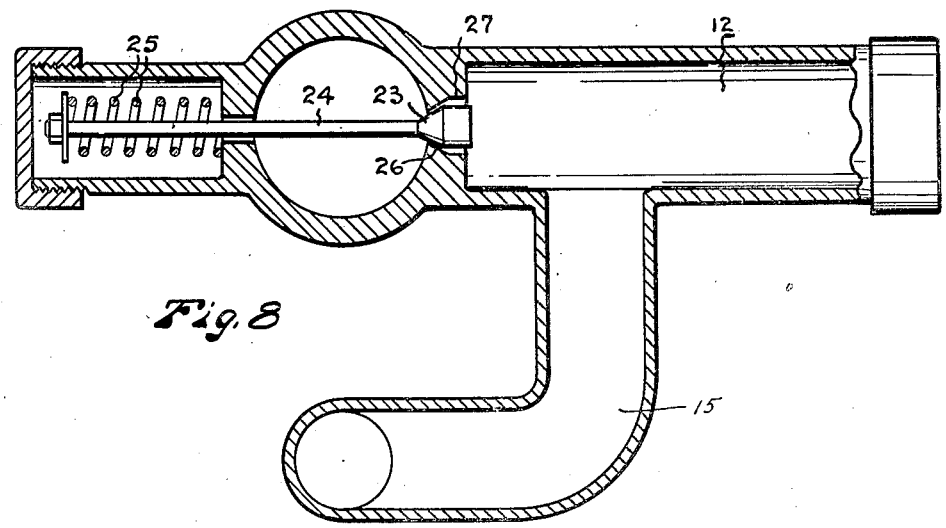
Fig. 8, is a cross-sectional view of a modified form of a device embodying our invention showing an annular aperture form by a spring controlled valve member.

A sleeve 7 having a slot 8 is fixedly mounted in a material discharge outlet conduit 9 so that said sleeve is in effect said conduit.

A piston 10 is slidably mounted in said sleeve so that it may move lengthwise of said slot and thereby regulate the extent to which said slot will be open. A second piston 11 is resiliently held against said first piston 10.

A mixing or an expansion chamber 12 is mounted so that it is oppositely disposed to slot 8. The form of this chamber is preferably cylindrical and may be closed at the end 13, opposite the slot. An outlet port 14 and conduit 15 leads off from said chamber 12 to supply the material to the container (not shown) in which container the article is marketed. This outlet is preferably located adjacent to or near to the slot 8. That portion of the sleeve 16 wherein the slot 8 is located is preferably reduced in thickness to a minimum and yet be able to withstand the strain incident to the high pressure of the material. The collar 17 functions as a reenforcing member to the reduced portion 16. The walls of the slot are also preferably outwardly diverging, (see Fig. 7) so that knife-like edges 18 are provided as the inner boundaries of the slot. These provisions afford a minimum of contact of the stream of material with the metal walls as it passes through the slot 8. The diameter of the chamber 12 is greater than that of the length of the slot so that the material in passing through said slot may not come in contact with the walls of said chamber immediately and not until it has lost its principal velocity by discharging into like material expanded.

An adjusting screw 19 is provided in cap 20 which may close the cylinder 21 in which the piston 11 operates. This adjusting screw forms a means to limit the movement of the piston 11 and a resilient means by which piston 11 may be yieldingly held may be provided by supplying air or fluid under pressure through conduit 22.

In the modified form shown in Fig. 8, a valve member 23 is mounted on rod 24 resiliently held by spring 25 against valve seat 26. A valve seat 26 for the inner portion thereof is diverging and then the outer portion thereof 27 is straight, paralleling the axis of the mixing chamber 12 so that the material under compression in discharging through the annular aperture form between in conjunction with the valve seat 26 is discharged into chamber 12 in a stream axially disposed in chamber 12.

Figure 9:
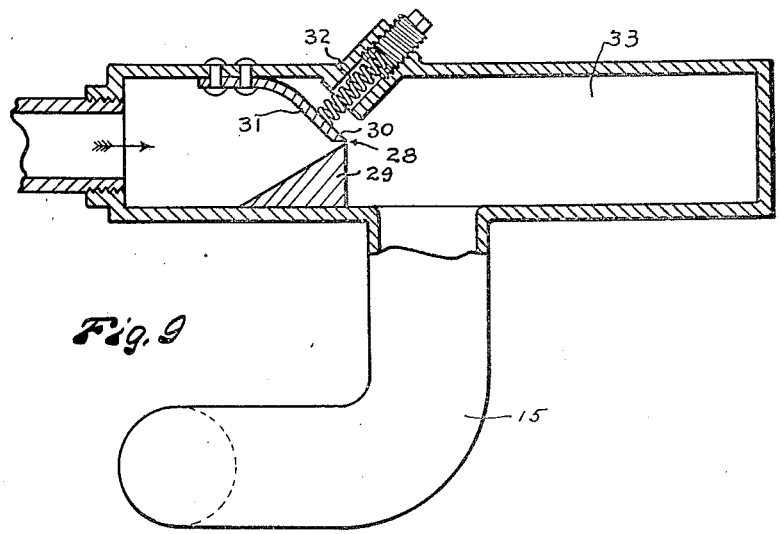
Fig. 9 is a cross-sectional view of a still further modified form of device embodying our invention showing a spring controlled slot form of aperture in conjunction with a rectangular form of chamber.

In the modified form shown in Fig. 9, a slot form of aperture 28 is formed between a fixed wall 29 and the movable wall 30 of spring member 31 which is resiliently held in closed position by helical spring 32 so that the material may be discharged axially into chamber 33 which may be of rectangular form.

Air is preferred as the resilient means because of the degree of resiliency and therefore the velocity of the discharging material through the slot can be more readily determined, in connection with a double piston form of slot regulating means as shown in Figs. 3, 4 and 5 and air also provides a more uniform control throughout the full stroke of a piston such as 10 and fluttering of the piston is eliminated.

In addition to the mode of operation of the device embodying our invention as disclosed in the above, it will be understood that the material or emulsion such as shortening into which air has been beaten in the beater pan (not shown) is supplied to the outlet conduit 9 under a relatively high pressure, so that air dispersed in the material is compressed. We find that for shortening, such pressure should not be less than one hundred fifty pounds and we find that two hundred fifty pounds is a very satisfactory working pressure. The material under this pressure displaces piston 10 to a certain degree which is yieldingly held in position tending to close slot 8. Upon displacing the piston 10, the material discharges through the slot 8. Immediately upon passing slot 8, the material expands with an explosive force due to the sudden release of the pressure. This induces a stream of material which has been under great compression to discharge at high velocity through the slot and strike against the closed end of the mixing or expansion chamber 12 and then the material surges back upon itself and finds its way out through outlet port 14. In starting up the device the material under high velocity impinges against the closed end 13 and then surges back to find its way out through the outlet 14. Ordinarily, the first material will be discarded due to the fact that it has contacted the metal walls before relatively complete expansion. The material immediately following does not reach the closed end at high velocity but is relatively expanded by being discharged into like material already expanded. In surging back to the outlet port 14 and in conduit 15, the material becomes thoroughly mixed. Obviously, a part of the expansion force is utilized in impelling the material to said outlet. The stream of material upon passing the slot is at extremely high velocity and is caused to shoot through the mixing chamber axially. The slot is of a length which is less than the diameter of the mixing chamber in order to prevent the material contacting the metal walls before it has lost much of its velocity or before it has lost much of its compression. In the device herein illustrated, the chamber is one and one-half inches in diameter while the slot is one inch long and $\frac{3}{32}$ of an inch in width. The outlet conduit 9 is one and one-quarter inches in diameter and the bore of the inlet conduit in that portion where the slot is disposed is $\frac{7}{8}$ of an inch in diameter. (In the above the diameter is given in terms of inside measurement.) Upon the sudden release of the pressure, the fluid, such as air which may be confined in the emulsion or shortening, suddenly expands and in doing so absorbs considerable heat and an appreciable drop in temperature is noticed.

By thus exploding, as it were, the material through the narrow slot the fluid such as air becomes most intimately dispersed through the material and is dispersed in uniformly sized minute particles as well as uniformly through the material. Also, the material is thoroughly broken up and no lumpiness is possible and a smooth homogeneous product results. In surging back in the mixing chamber it is further very thoroughly mixed, and this continues to the point of discharge.

Furthermore, this arrangement of the mixing chamber functions to convert a stream of material of high velocity to a stream of low velocity so that the material may be supplied to the containers without splashing. This is an important provision of our invention as this arangement of the mixing chamber in relation to the aperture not only provides for thorough mixing of the material but also provides baffle means to convert the stream of high velocity into a stream of such very low velocity that it may be supplied to containers without splashing and all this is done in a device of most compact form and in a manner which does not introduce streaks of dark colored material into the product.

For various reasons, the pressure in the supply or material discharge outlet conduits 9 may not be constant. Particularly and essentially is this true where the material is coming from a metering device where the pressure is obviously intermittent. However, even though the pressure may vary in the outlet conduit the material must not be allowed to pass through the slot without having imparted thereto a minimum of velocity. Accordingly, provision is made for this by providing means which will regulate the size of the opening of the slot, it being understood that a certain minimum of velocity is essential to provide the whitening effect and to provide the dispersion of the fluid or air through the material in minute particles of uniform size and uniformly distributed. Manifestly, when the pressure is great, the piston 10 rises and allows the material to go through these slots at a certain high velocity and as the pressure may fall off the piston 11 depresses piston 10 and closes off the slot and when the pressure on the material in outlet conduit 9 falls below the pressure that is applied to piston 11, obviously the discharge to the outlet is entirely cut off. Hence, the velocity of the material passing through the slot is automatically maintained with a practical degree of uniformity, i. e. it is held to a required minimum velocity. By means of the adjusting screw 19 an upper positive limit is provided for the displacement of the piston 11 which serves to keep the velocity within ranges that are practical in operation. As already explained above it is important that the material be kept from contacting the metal walls of the device and the more suddenly can be the release of the pressure the better the product. Consequently, we preferably supply knife-like edges 18 for the slot. The arrangement of the mixing chamber manifestly adapts the device as an efficient mixing mechanism apart from any other function which may be inherent in the device.

By subjecting the emulsion or shortening to the above described process there results a homogeneous product that has the characteristics of keeping for a much longer time than the product manufactured according to present day practice.

Obviously changes may be made in the form, dimensions and the arrangements of the parts of my invention without departing from the principle thereof, the above setting forth only a preferred form of embodiment.

We claim:

1. A device of the character described embodying, a material discharge outlet conduit having an aperture therein; a piston in said outlet conduit operatively mounted with respect to said aperture; a yieldingly held second piston which operates in opposition to said first piston; and a mixing chamber oppositely disposed to said aperture having an outlet port.

2. A device of the character described embodying, a material discharge outlet conduit having an aperture therein; a piston in said outlet conduit operatively mounted with respect to said aperture; a yieldingly held second piston which operates in opposition to said first piston; and a mixing chamber oppositely disposed to said aperture having the end remote to said aperture closed, said chamber having an outlet port.

3. A device of the character described embodying, a material discharge outlet conduit having an aperture therein; a piston in said outlet conduit operatively mounted with respect to said aperture; a yieldingly held second piston which operates in opposition to said first piston; and a mixing chamber oppositely disposed to said aperture having the end remote to said aperture closed, said chamber having an outlet port located near the aperture end of the mixing chamber.

4. A device of the character described embodying, a material discharge outlet conduit having a slot therein; means regulating the degree of opening of said slot; and a mixing chamber of cylindrical form oppositely disposed to said slot, said cylinder being of a diameter greater than the length of said slot whereby the material passing through the slot clears the adjacent walls of the chamber, said chamber having an outlet port therein.

5. A device of the character described, embodying a material discharge outlet conduit having a variable sized discharge opening through which the material may be passed under pressure, and a mixing chamber oppositely disposed to said opening having a wall remote to said opening against which the material may impinge upon discharge from the opening, said mixing chamber having an outlet port located intermediate the ends of said chamber, whereby the stream of compressed material issuing from the opening is discharged into material expanded.

6. A device of the character described embodying a material discharge outlet conduit having a variable sized discharge opening through which the material may be passed under pressure, and a mixing chamber oppositely disposed to said opening having the end remote to said opening closed, said chamber having an outlet port located intermediate the ends of said chamber.

7. In a device of the character described, having a material discharge outlet having a discharge aperture, a chamber oppositely disposed to said aperture having the end opposite said aperture closed in which chamber said material expands, and an outlet port of relatively large capacity in said chamber through which outlet port said expanded material flows after cushioning the material issuing from the discharge aperture.

In witness whereof, we hereunto subscribe our names this 2d day of September, A. D. 1927.

THOMAS ARTHUR FEE, Jr.
HARRY LAMB.